United States Patent [19]
Green

[11] Patent Number: 6,141,964
[45] Date of Patent: Nov. 7, 2000

[54] FRONT BRAKE MASTER CYLINDER RELOCATION KIT

[76] Inventor: Gary L. Green, 17060 Judicial Rd., Lakeville, Minn. 55044

[21] Appl. No.: 09/109,510

[22] Filed: Jul. 2, 1998

Related U.S. Application Data

[60] Provisional application No. 60/051,748, Jul. 3, 1997.

[51] Int. Cl.[7] ....................................................... B60T 7/10
[52] U.S. Cl. .................................. 60/594; 60/533; 206/223
[58] Field of Search ....................... 60/533, 594; 206/223, 206/232, 319

[56] References Cited

U.S. PATENT DOCUMENTS

| | | | |
|---|---|---|---|
| 4,200,163 | 4/1980 | Bass et al. | 60/588 |
| 4,551,976 | 11/1985 | Nix et al. | 60/533 |
| 5,549,367 | 8/1996 | Matsuto | 60/594 |

FOREIGN PATENT DOCUMENTS

| | | | |
|---|---|---|---|
| 33565 | 2/1983 | Japan | 60/562 |
| 215461 | 10/1985 | Japan | 188/352 |
| 1406065 | 6/1988 | U.S.S.R. | 206/319 |

*Primary Examiner*—F. Daniel Lopez
*Attorney, Agent, or Firm*—Merchant & Gould P.C.

[57] ABSTRACT

A front brake master cylinder relocation kit which may be used for example on Harley-Davidson® motorcycles. The kit includes a master cylinder; a brake cable; a hand lever capable of being mounted on a handlebar; a brake hose; a mounting bracket, for mounting the master cylinder on a motorcycle; and a package for accommodating the master cylinder, the brake cable, the hand lever, the brake hose, and the mounting bracket. The master cylinder includes a brake cable connector; an actuator lever; an actuator device, operatively connected to the actuator lever; an oil container inside the master cylinder for accommodating hydraulic oil; and a brake hose connector operatively connected to the oil container. The package may be provided with assembly instructions for the kit.

15 Claims, 7 Drawing Sheets

FRONT BRAKE MASTER CYLINDER RELOCATION KIT

This application claims priority from Provisional Application Serial No. 60/051,748 which was filed on Jul. 3, 1997.

FIELD OF THE INVENTION

The present invention relates to systems for relocating front brake master cylinders on motorcycles.

BACKGROUND OF THE INVENTION

Motorcycles generally have a front wheel brake in addition to a foot actuated rear wheel brake. The front wheel brake is typically controlled by hydraulic pressure actuated by a hand lever on the handlebar of the motorcycle. Traditionally, the master cylinder, which contains the hydraulic oil, has been mounted on the handlebar, close to the hand lever which actuates the brake.

Figure 1:
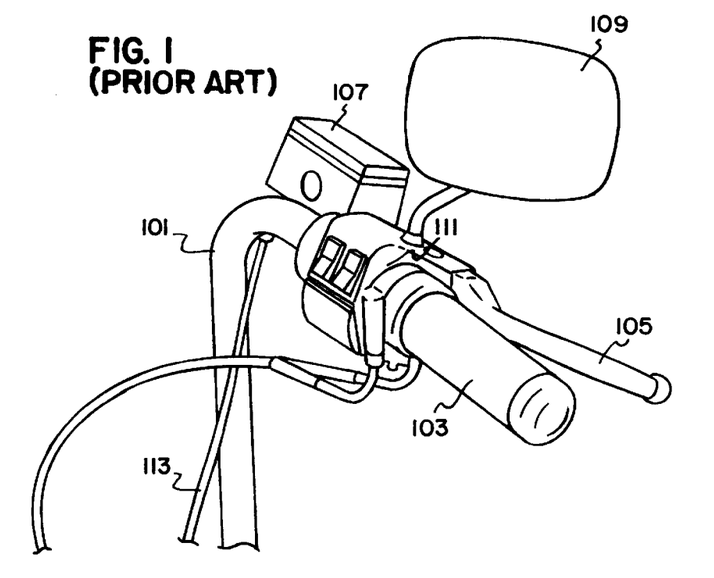
FIG. 1 shows a traditional motorcycle handlebar.

FIG. 1 shows an exemplary handlebar 101. The master cylinder 107 is mounted on the handlebar 101 adjacent the throttle handle 103. The hand lever 105 is used to actuate the front brake through the master cylinder 107 and the brake hose 113. The hand lever 105 may be mounted to the handlebar 101 such as to also accommodate various controls 111 for the motorcycle, and a rearview mirror 109.

Many motorcycle enthusiasts consider the placement of the master cylinder on the handlebar unsightly and undesirable. The aesthetical disadvantage of the placement exists on motorcycles with any type of handlebar. In addition, on a motorcycle with a tall elevated handlebar the location of the master cylinder may be unsuitable also in that it partially obstructs the driver's view.

SUMMARY OF THE INVENTION

The invention consists of a front brake master cylinder relocation kit for motorcycles. A front brake master cylinder relocation kit includes a master cylinder; a brake cable; a hand lever capable of being mounted on a handlebar; a brake hose; a mounting bracket, for mounting the master cylinder on a motorcycle; and a package for accommodating the master cylinder, the brake cable, the hand lever, the brake hose, and the mounting bracket. The master cylinder includes a brake cable connector; an actuator lever; an actuator device, operatively connected to the actuator lever; an oil container inside the master cylinder for accommodating hydraulic oil; and a brake hose connector operatively connected to the oil container.

These and various other advantages and features of novelty which characterize the invention are pointed out with particularity in the claims annexed hereto and forming a part hereof. However, for a better understanding of the invention, its advantages, and the object obtained by its use, reference should be made to the accompanying drawings and descriptive matter which form a further part hereof, and in which is illustrated and described preferred embodiments of the invention.

BRIEF DESCRIPTION OF THE DRAWINGS

In the drawings, wherein corresponding reference numerals generally indicate corresponding parts throughout the several views.

DETAILED DESCRIPTION OF THE DRAWINGS

Figures 2, 8:
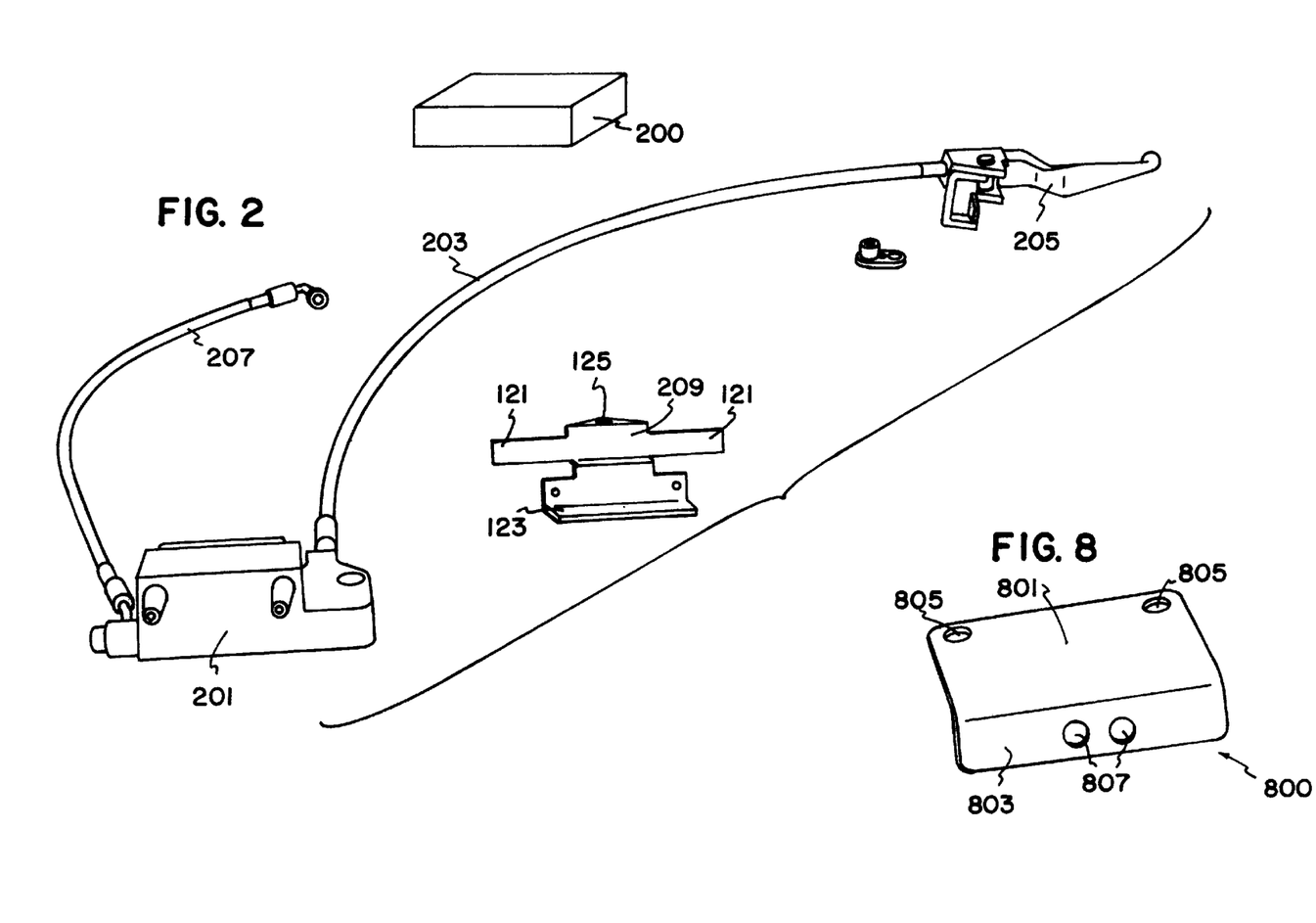
FIG. 2 shows a kit in accordance with the principles of the invention.
FIG. 8 shows a mounting bracket.

FIG. 2 shows a front brake master cylinder relocation kit. The kit includes a master cylinder 201, which may accommodate hydraulic oil. A brake cable 203 is connected to the master cylinder 201 at one end, and the other end is connected to a hand lever 205. The hand lever 205 is used to actuate the master cylinder 201 through the brake cable 203. A brake hose 207 is connected to the master cylinder 201 on one of its ends. The other end of the brake hose 207 may be connected to a brake caliper on a motorcycle.

A mounting bracket 209 may be mounted on the master cylinder 201, whereby the front brake master cylinder relocation system may be arranged on a motorcycle. The mounting bracket 209 is adapted to allow the master cylinder 201 to be mounted on the front fork of the motorcycle. The bracket 209 includes wings 121 extending to the sides of the bracket. A master cylinder may be mounted on the master cylinder holder 123. A screw may be fitted through opening 125 to fasten the bracket 209 to the triple tree clamp on the front fork of a motorcycle. When the bracket 209 is so mounted, the wings 121 rest against the front forks to support the arrangement. Typically, the bracket 209 substantially blocks the view of the master cylinder from the front of the motorcycle, which may improve the visual appearance of the motorcycle.

The mounting bracket 209 may be configured to fit one or more particular models of motorcycles. It is contemplated that different mounting brackets 209 will be provided depending on the model of the motorcycle where the relocation kit is going to be used.

The front brake master cylinder relocation kit is preferably sold in a package, whereby a customer purchases all parts necessary to relocated the master cylinder in one convenient enclosure. The package is schematically illustrated as box 200 in FIG. 2, but many different packages, such as bags, may be used.

The kit may be provided with assembly instructions, for example outlining the steps of relocating the master cylinder using the kit.

An embodiment of a master cylinder 201 is shown in FIGS. 3A–3D. The master cylinder 201 includes an oil container 204 for accommodating hydraulic oil. The master cylinder 201 has two parallel plane members 202 extending from one end of the oil container 204. The plane members 202 include openings 206 for rotatably mounting an actuator lever (not shown). The plane members 202 further include a brake cable connector 210 towards their upper ends. The brake cable connector 210 may for example, include a plane horizontal member between the plane members 202, and an opening 211 through the plane member.

A bleeding hole 215 is provided to the oil container 204. The bleeding hole 215 may, for example, be used when installing the front brake master cylinder relocation kit. The bleeding hole 215 may be opened during installation, whereby hydraulic oil will exit through the bleeding hole 215 when a sufficient amount of oil has been inserted into the system. The bleeding hole 215 may then be closed to avoid leakage of oil during use.

A cover may be mounted over the master cylinder 201 with bolts, using the openings 217. Many different well-known covers may be used with the master cylinder 201. It is contemplated that the cover presently provided with the original master cylinder, for example on Harley-Davidson® motorcycles, may be used. Also, it is contemplated that the diaphragm provided with the original master cylinder, for example on Harley-Davidson® motorcycles, may be used.

The openings 219 at the bottom of the master cylinder 201 may, for example, be used for mounting the master cylinder 201 on a mounting bracket. The actuator cavity 221 will be used to accommodate an actuator pin (not shown). The actuator cavity 221 passes through the master cylinder 201 with one opening adjacent the plane members 202 and another opening adjacent to a brake hose connector 213. The actuator cavity is connected to the oil container 204 by at least one opening, whereby hydraulic oil may pass between the actuator cavity 221 and oil container 204. The actuator cavity 221 may be given a particular shape in consideration of the particular actuator pin to be used, and the intended use of the system. The opening of the actuator cavity 221 adjacent the plane members 205 may also be provided with a counter bore 223. The counter bore 223 may also be chamfered.

An embodiment of the actuator lever 401 is shown in FIGS. 4A–4D. The actuator lever 401 will be rotatably mounted between the plane members 202 of the master cylinder 201. The actuator lever will be used to transfer action from the brake cable 203 to an actuator pin in the master cylinder 201.

The actuator lever 401 includes a cable arm 403 and an actuator arm 405. The cable arm 403 is substantially perpendicular to the actuator arm 405. The actuator arm 405 is joined to the cable arm 403 by a hinge member 407. The hinge member 407 will allow the actuator lever 401 to be rotatably mounted to the master cylinder 201, for example by the tubular member 413 engaging the openings 206 on the plane members 202.

The cable arm 403 will be connected to the brake cable 203, for example using the opening 409. As will be further discussed later, the brake cable 203 may include a cable with a block at one end, which block may engage the opening 409. Similarly, the opening 411 may be used for connecting the actuator lever 401 to the actuator pin of the master cylinder 201.

Figure 3A:
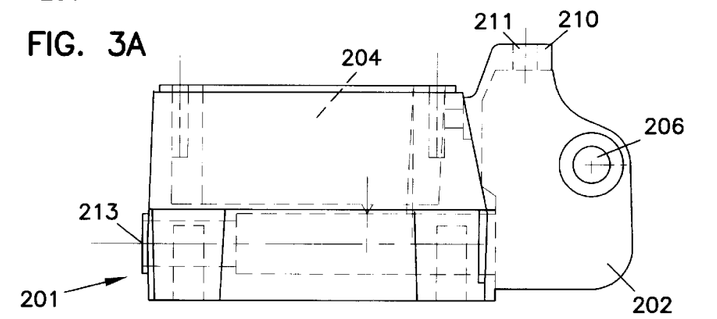
FIGS. 3A–3D show side, top, bottom and front views of a master cylinder.
Figure 3B:
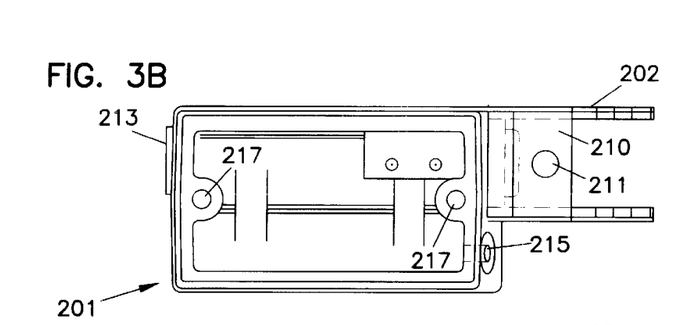
Figure 3C:
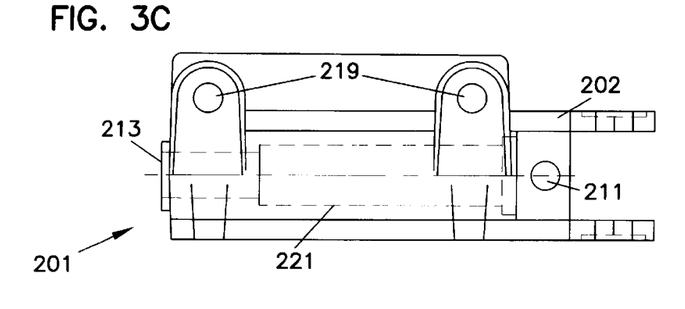
Figure 3D:
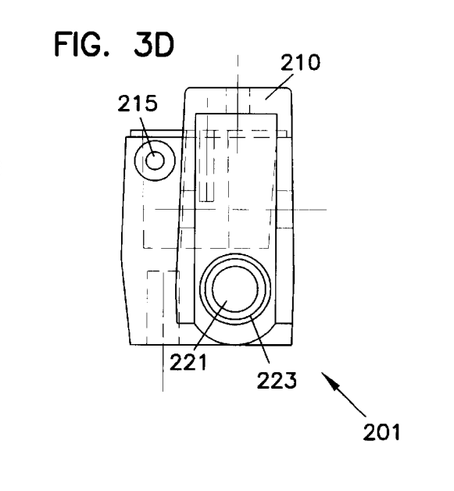
Figure 4A:
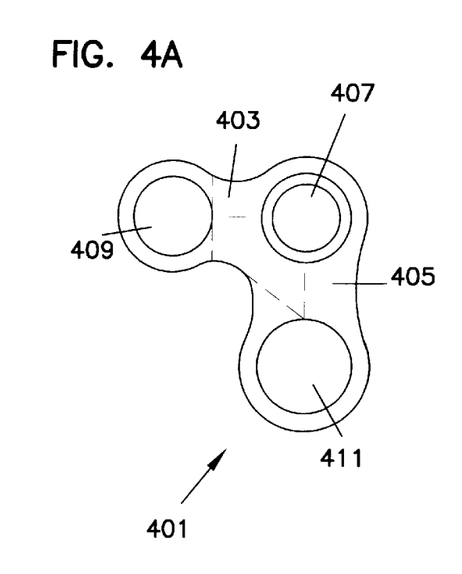
FIGS. 4A–4D show front view, first and second side views and top view of an actuator lever.
Figure 4B:
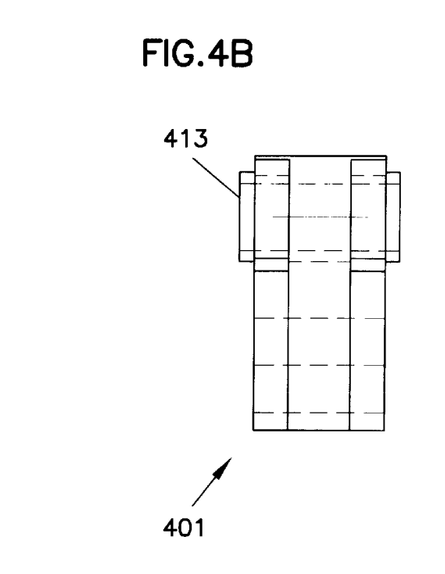
Figure 4C:
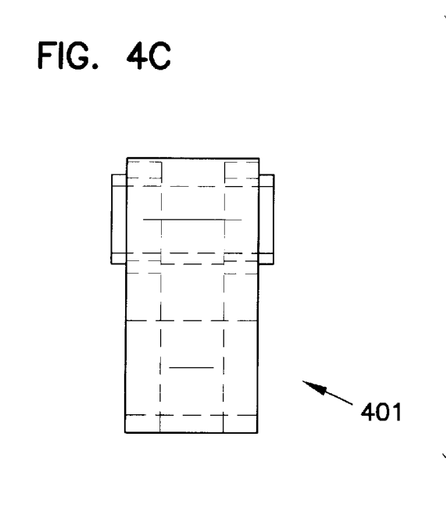
Figure 4D:
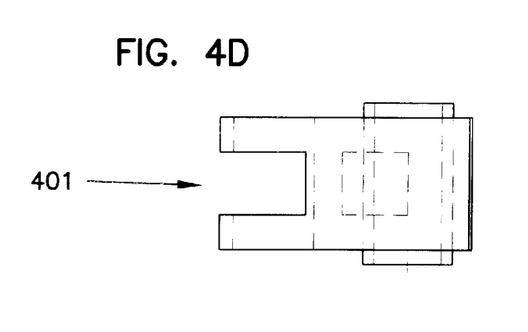
Figure 5:
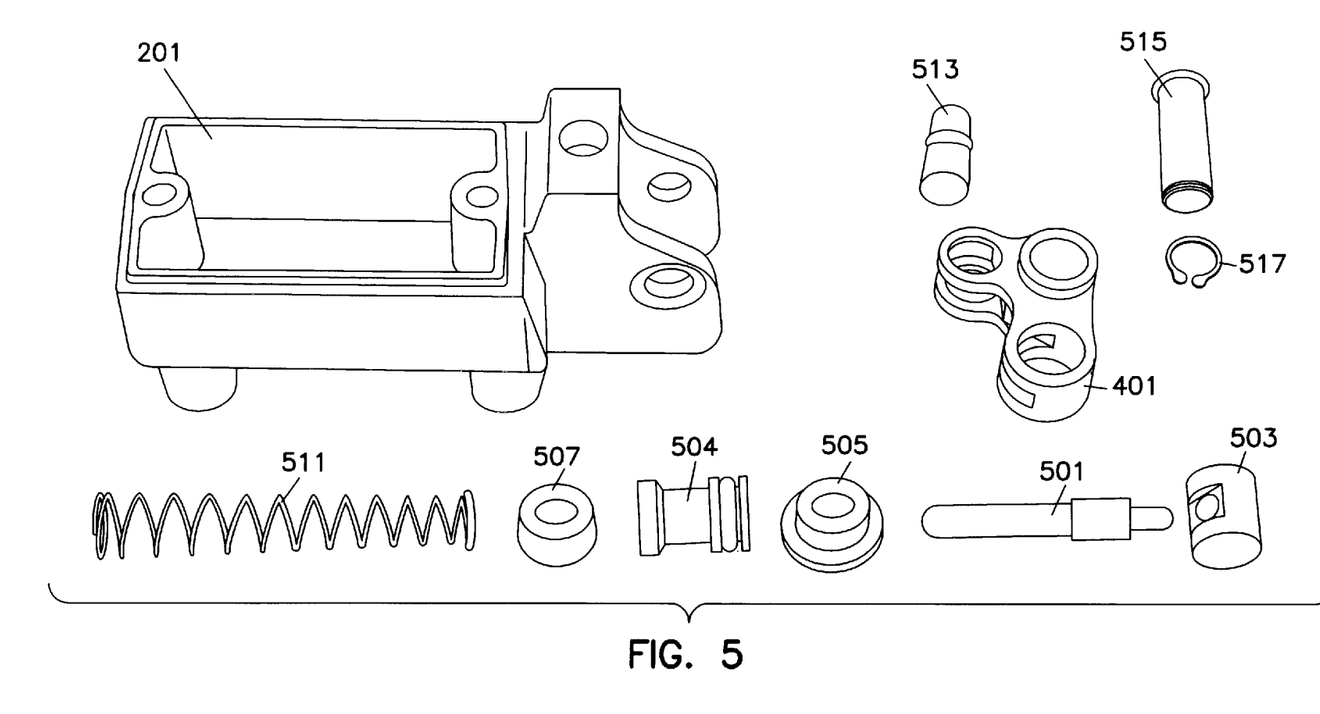
FIG. 5 show the master cylinder and associated parts.

FIG. 5 shows the master cylinder 201 and the parts which will be mounted on the master cylinder 201. The actuator pin 501 will extend through the actuator cavity 411 in FIG. 3. One end of the actuator pin 501 will be received in the cylinder piece 503, which is adapted to fit into the opening 221 of the actuator lever 401. The seals 505 and 507 will be used to seal between the actuator pin 501 and the actuator cavity 221. The piston 509 will engage the actuator pin 501 and serve to actuate the hydraulic oil in the actuator cavity 221. The spring 511 will be mounted in the actuator cavity 221 to bias the actuator pin 501 toward the actuator lever 401.

The cylinder piece 513 may be fitted into the opening 409 of the actuator lever 401 and will be used to hold the brake cable 203. The pin 515 and the C-ring 517 may be used for rotatably mounting the actuator lever 401 to the master cylinder 201.

Figure 6:
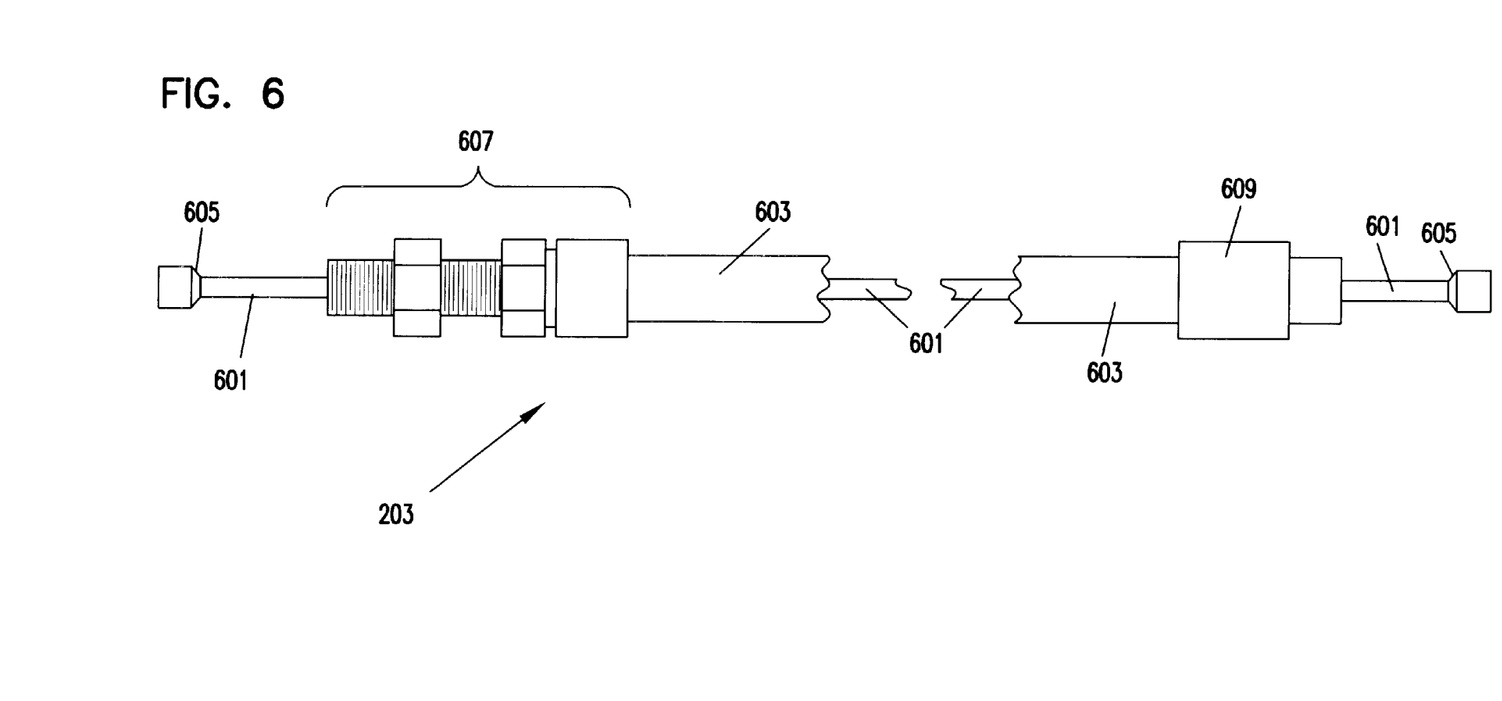
FIG. 6 shows a brake cable.

FIG. 6 shows an embodiment of the brake cable 203. The brake cable 203 includes a cable 601 with blocks 605 at each end. A cable housing 603 covers part of the cable 601, such that the cable 601 may slide inside the cable housing 603. The cable housing 603 has connectors 607 and 609, respectively, at its ends. The connector 607 will be used to connect the brake cable 203 to the brake cable connector 210 on the master cylinder 201. The connector 609 will be used to connect the brake cable 203 to the hand lever 205. It is noted that the brake cable 203 is shown in a partial view in FIG. 6; a central portion of the brake cable 203 has been omitted. The length of the brake cable 203 may be chosen in consideration, for example, of the distance between the hand lever 205 when mounted on the handlebar, and the master cylinder 201 when mounted. Furthermore, the length of the brake cable 203 may be chosen such that the brake cable does not become stretched when the handlebar is turned to either a left or right extreme position.

Figure 7A:
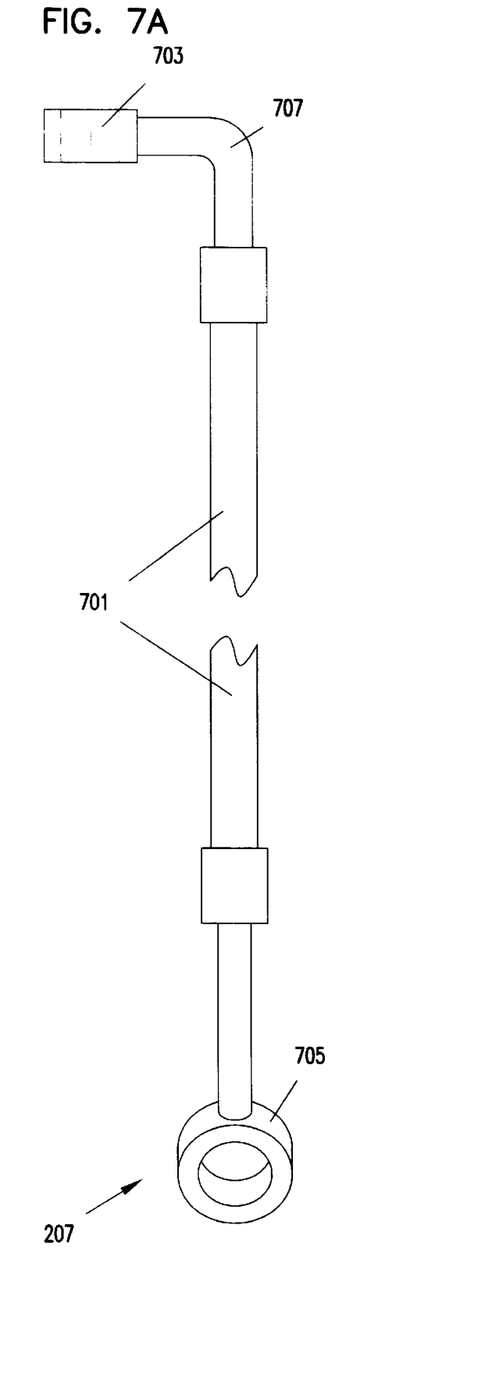
FIGS. 7A–7B show front and side views of a brake hose.
Figure 7B:
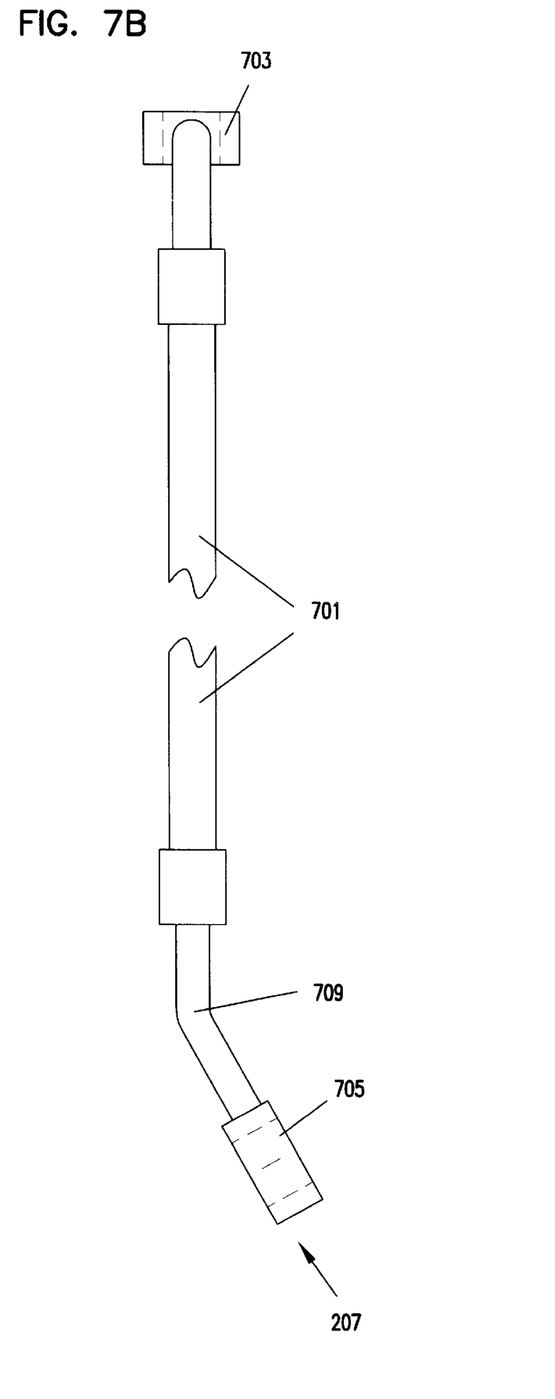

An embodiment of the brake hose 207 is shown in FIGS. 7A and 7B. The brake hose 207 includes a hydraulic cable 701 provided with banjo fittings 703 and 705 at the ends. Well-known hydraulic hoses and banjo fittings may be used with embodiments of the invention. The banjo fitting 703 is provided at an angle from a general direction of the hydraulic hose 701. The angle is provided by the first curved portion 707. For example, the first curved portion 707 may provide the banjo fitting 703 substantially perpendicular to the general direction of the hydraulic hose 701. Similarly, the banjo fitting 705 is provided at an angle through the second curved portion 709. The first and second curved portions 707 and 709 may be configured in consideration of the particular application where the brake hose 207 will be used. For example, the portions 707 and 709 may be angled to fit the particular mounting structures at both ends of the brake hose 207.

An embodiment of the mounting bracket 800 is shown in FIG. 8. The bracket 800 may be used for mounting the master cylinder 201 to the frame of a motorcycle.

The bracket 800 includes a first plane member 801 for mounting the master cylinder 201 to the bracket 800. A second plane member 803 is provided on one edge of the member 801, at an angle with respect to the first plane member 801.

The first plane member 801 is provided with openings 805, whereby a master cylinder may be mounted on the bracket 800. The second plane member 803 is provided with openings 807, whereby the mounting bracket 800 for example may be mounted to the frame of the motorcycle.

The angle between the first and second plane members 801 and 803 is preferably chosen in consideration of the inclination of the part of the motorcycle frame where the bracket 800 is going to be mounted and/or the desired orientation of the master cylinder in its mounted position.

Figure 9:
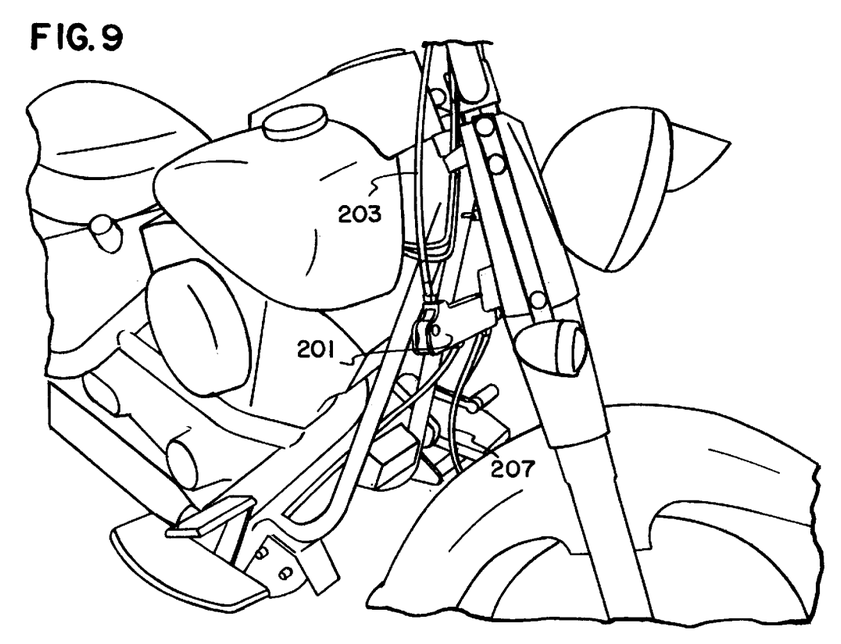
FIG. 9 shows a front brake master cylinder relocation kit mounted on a motorcycle.

FIG. 9 shows part of a motorcycle with a front brake master cylinder relocation kit mounted. The master cylinder 201 is mounted on the motorcycle frame, adjacent where the front fork is rotatably mounted to the frame. The brake cable 203 is connected to the master cylinder 201 and extends upward toward the handlebar of the motorcycle (not shown). The brake hose 207 is connected to the other side of the master cylinder 201 and extends downward toward the brake caliper (not shown).

As is seen from the drawing, the front brake master cylinder relocation kit allows the master cylinder to be placed at a position where the aesthetic appearance is significantly less disturbing, while maintaining the front brake function unimpeded.

Although the invention has been described with respect to preferred embodiments thereof, it is to be understood that it is not so limited, since changes and modifications can be made therein which are within the full intended scope of this invention as defined by the broad general meaning of the wording in the appended claims.

I claim:

1. A front brake master cylinder relocation kit for motorcycles, the kit including:
   a master cylinder comprising:
   a brake cable connector;
   an actuator lever, operatively connected to the brake cable connector;
   an actuator device, operatively connected to the actuator lever;
   an oil container inside the master cylinder for accommodating hydraulic oil; and
   a brake hose connector operatively connected to the oil container;
   a brake cable, adapted for connection to the brake cable connector and capable of actuating the actuator lever;
   a hand lever adapted for connection to the brake cable and capable of being mounted on a handlebar;
   a brake hose, a first end of which is adapted for connection to the brake hose connector, and a second end of which is adapted for connection to a brake caliper;
   a mounting bracket, for mounting the master cylinder on a motorcycle; and
   a package for accommodating the master cylinder, the brake cable, the hand lever, the brake hose, and the mounting bracket.

2. The kit of claim 1, wherein the brake cable connector includes a plane member mounted on the master cylinder and an opening through the plane member substantially perpendicular to a direction of the actuator device.

3. The kit of claim 1, wherein the actuator lever includes:
   a cable arm for connecting the actuator lever to the brake cable;
   an actuator arm for connecting the actuator lever to the actuator device, wherein the actuator arm is substantially perpendicular to the cable arm; and
   a hinge member between the cable arm and the actuator arm, for mounting the actuator lever to the master cylinder such that the actuator lever may be rotated around the hinge member.

4. The kit of claim 1, wherein the actuator device comprises:
   an actuator pin, a first end of which is connected to the actuator lever, and a second end of which is connected to the brake hose connector, whereby the actuator pin extends though the oil container in the master cylinder;
   a spring around the actuator pin for biasing the actuator pin away from the brake hose connector; and
   seals between the oil container and the first and second ends of the actuator pin, for allowing the actuator pin to move in the master cylinder without oil leakage.

5. The kit of claim 1, wherein the oil container further includes a bleeding hole through the master cylinder for allowing the hydraulic oil to exit the oil cylinder when the bleeding hole is in an open position.

6. The kit of claim 1, wherein the brake hose connector is a dual brake hose connector, allowing two brake hoses to be connected to the master cylinder.

7. The kit of claim 1, wherein the master cylinder is formed from die cast aluminum.

8. The kit of claim 1, wherein the mounting bracket includes:
   a first plane member mounted to the master cylinder; and
   a second plane member, extending at an angle from the first plane member, and capable of being mounted to a motorcycle frame, whereby the front brake master cylinder relocation kit may be mounted on the frame.

9. The kit of claim 1, wherein the mounting bracket includes:
   a plane member mounted on the master cylinder;
   a mounting member, connected to the plane member, capable of being mounted on a front fork of the motorcycle, whereby the front brake master cylinder relocation kit may be mounted on the front fork of the motorcycle.

10. The kit of claim 1, wherein the brake cable includes:
    a cable with a block at each end;
    a cable housing over a part of the cable, whereby the cable may slide inside the cable housing; and
    a first connector at a first end of the brake cable for connecting the brake cable to the brake cable connector on the master cylinder, and a second connector at a second end of the brake cable for connecting the brake cable to the hand lever.

11. The kit of claim 1, wherein the hand lever includes a lever housing for mounting the hand lever on the handlebar.

12. The kit of claim 1, wherein the brake hose includes:
    a hydraulic hose;
    a first banjo fitting at the first end of the hydraulic hose, capable of connecting the brake hose to the brake hose connector; and
    a second banjo fitting at a second end of the hydraulic hose, capable of being connected to the brake caliper.

13. The kit of claim 1, further including assembling instructions provided in the package.

14. A front brake master cylinder relocation kit for motorcycles, the kit including:
    a master cylinder comprising:
    a brake cable connector;
    an actuator lever, operatively connected to the brake cable connector;
    an actuator device, operatively connected to the actuator lever;
    an oil container inside the master cylinder for accommodating hydraulic oil; and
    a brake hose connector operatively connected to the oil container;
    a brake cable, adapted for connection to the brake cable connector and capable of actuating the actuator lever;
    a hand lever adapted for connection to the brake cable and capable of being mounted on a handlebar;
    a brake hose, a first end of which is adapted for connection to the brake hose connector, and a second end of which is adapted for connection to a brake caliper;
    means for mounting the master cylinder on a front fork of a motorcycle; and
    a package for accommodating the master cylinder, the brake cable, the hand lever, the brake hose, and the means for mounting the master cylinder.

15. A front brake master cylinder relocation kit for motorcycles, the kit including:
    a master cylinder comprising:
    a brake cable connector;
    an actuator lever, operatively connected to the brake cable connector;

an actuator device, operatively connected to the actuator lever;

an oil container inside the master cylinder for accommodating hydraulic oil; and a brake hose connector operatively connected to the oil container;

a brake cable, adapted for connection to the brake cable connector and capable of actuating the actuator lever;

a hand lever adapted for connection to the brake cable and capable of being mounted on a handlebar;

a brake hose, a first end of which is adapted for connection to the brake hose connector, and a second end of which is adapted for connection to a brake caliper;

means for mounting the master cylinder on a frame of a motorcycle; and a package for accommodating the master cylinder, the brake cable, the hand lever, the brake hose, and the means of mounting the master cylinder.

\* \* \* \* \*